July 19, 1932.  W. LE V. ZEIGLER  1,868,404
FEEDER FOR DRY CHEMICALS
Filed Sept. 7, 1929  2 Sheets-Sheet 1
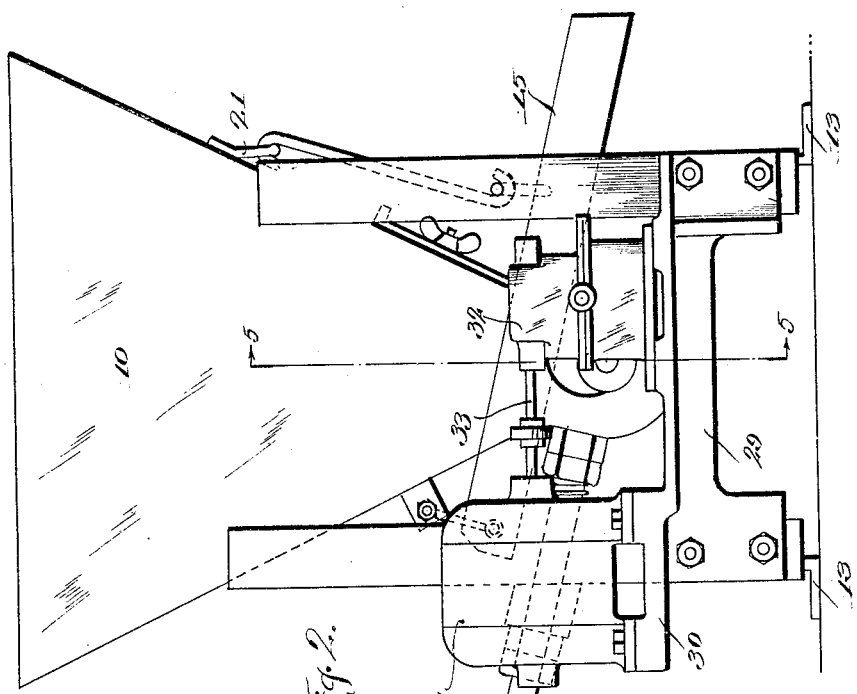
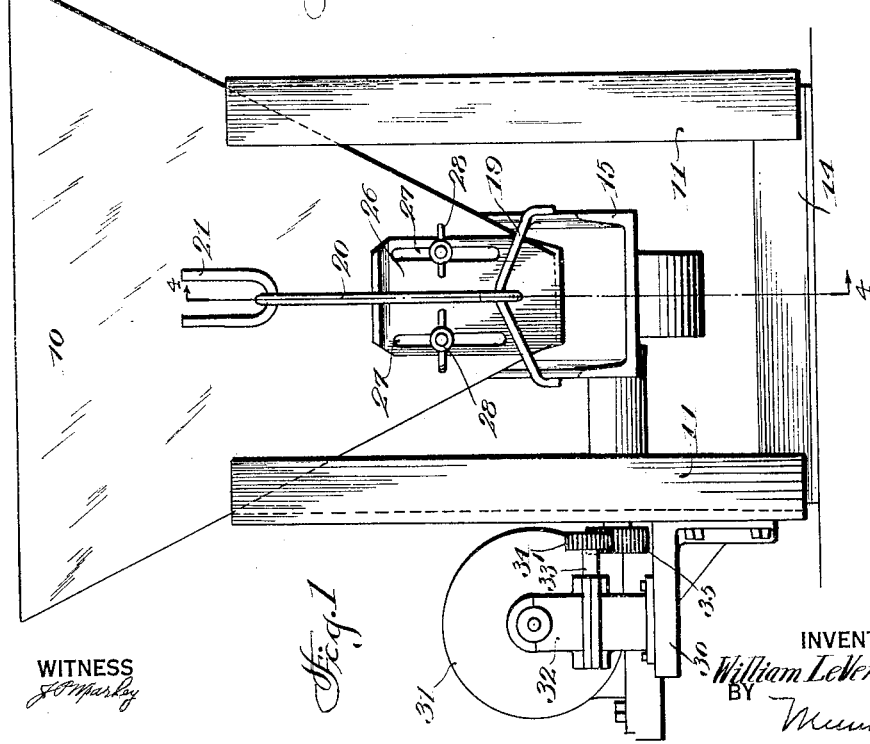
INVENTOR
William LeVerne Zeigler
BY
ATTORNEY

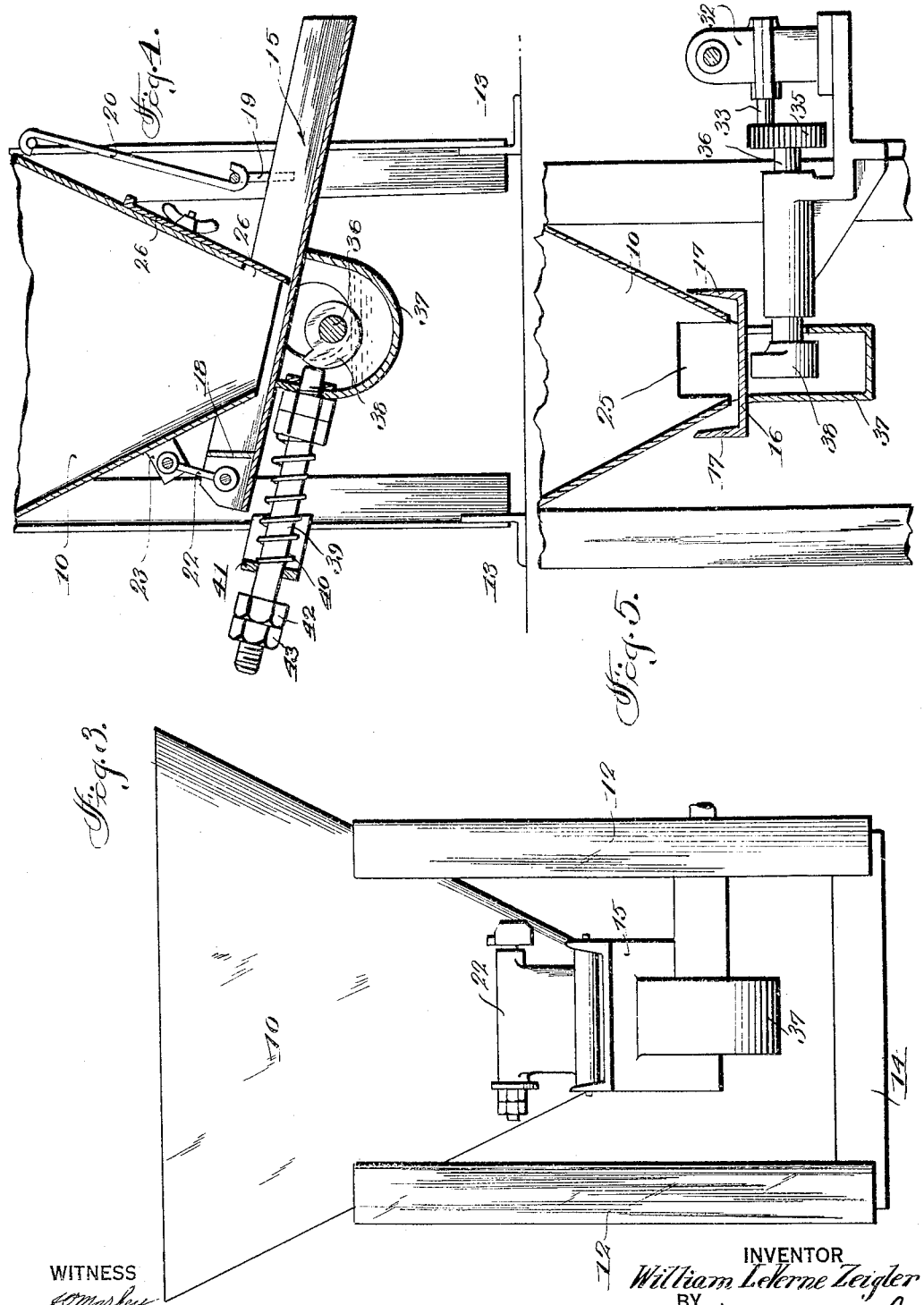

Patented July 19, 1932

1,868,404

UNITED STATES PATENT OFFICE

WILLIAM LE VERNE ZEIGLER, OF WALLACE, IDAHO, ASSIGNOR TO COEUR D'ALENE HARDWARE AND FOUNDRY COMPANY, OF WALLACE, IDAHO, A CORPORATION OF IDAHO

FEEDER FOR DRY CHEMICALS

Application filed September 7, 1929. Serial No. 391,089.

This invention relates to improvements in feeders, and more particularly relates to feeders for dry chemicals or reagents in flotation plant.

The invention has for its object to provide a feeder as above characterized which may be quickly and easily adjusted over a wide range for absolute accuracy in the amount of reagent feed in a given unit of time.

It is also an object of the invention that the device insure a constant rate of feed irrespective of the amount of reagent in the hopper thereof.

It is also within the scope of the objects of the invention that the device be compact in construction and not easy to get out of repair.

The invention is illustrated by way of example in the accompanying drawings, in which:

Figure 1 is a front elevation of a feeder constructed in accordance with this invention;

Figs. 2 and 3 are side and rear elevations respectively of the same; and

Figs. 4 and 5 are fragmentary vertical sectional views taken substantially on the lines 4—4 and 5—5 of Figs. 1 and 2, respectively.

Referring to the drawings more particularly 10 indicates generally a hopper which is preferably made of steel plate and of the shape shown the hopper is supported by a metal framework comprising two forward legs 11 and two rearward legs 12 which are preferably welded to the hopper and provided with feet and braces as shown at 13 and 14, respectively.

Beneath the hopper is arranged a shaker pan feeder generally designated by the reference numeral 15. This pan is of metal and may comprise an elongated bottom 16 with the side walls 17 and end wall 18. The pan is supported at one end by a yoke 19, link 20 and depending U-shaped bracket 21; while its other end is supported by links 22 and bracket plates 23. As is clearly apparent the pan 15 is free for reciprocal movement beneath the outlet of the hopper. It will be noted the forward wall of the hopper is provided with a recess 25 over which there is slidable a gate 26. The gate is slotted as at 27 through which extend suitable threaded studs carrying wing nuts 28 whereby the gate 26 may be adjusted with respect to the bottom 16 of pan 15.

The legs of the device have suitably bolted thereto a plate 29 which is provided with a flange 30 adapted for supporting an electric motor 31 and a reduction gear unit 32. The unit 32 comprises a suitable housing with a bearing for the outer end of motor driven shaft 33. The housing also carries suitable gearing whereby a shaft 33' is driven from the motor 31. The shaft 33' carries a gear 34 which meshes with a gear 35 carried by a shaft 36. The shaft 36 is suitably supported beneath the hopper 10 with its free end disposed within an oil reservoir 37 carried beneath the shaker pan 15. The last named end of shaft 36 carries a cam 38 engaging the one end of a spring pressed push rod 39. The rod 39 is supported for reciprocal movement against the tension of coil spring 40 by a bracket plate 41. The tension of spring 40 may be adjusted by nut 42 which may be locked in adjusted position by a lock nut 43.

In the use of the feeder heretofore described the hopper 10 is filled with the dry chemical reagent ground or crushed to the proper size. The speed of shaft 36 is constant, and with slight manipulation of the gate 26 and tension spring 40 the amount of reagent feed from the spout 15 in a given unit of time can be accurately controlled. The height of the gate 26 controls the depth of the reagent in the pan 15, and the position of the nut 49 controls the stroke of the movement of rod 39. The amount of material in hopper 10 will not vary the feed control from shaker pan 15.

It may be noted that the gears 34—35 should be covered with a suitable housing; also that oil should be maintained in reservoir 37 at such a depth to insure proper lubrication of the cam 38.

I claim:

1. A feeder of the character described comprising a frame, a hopper mounted within said frame and having an inclined restricted open lower end, an outlet pan beneath the hopper capable of reciprocal movement in parallel relation to the inclined open end thereof, swinging supports for said pan at the forward and rear sides of said frame and hopper, a motor driven cam beneath said pan, a member adapted to be actuated by said cam to impart substantially rectilinear motion to said pan in one direction, spring means cooperative with said member for actuating said pan in a reversed direction, means cooperative with said member and said spring means for adjusting the working stroke of said pan, and an adjustable gate carried by the front wall of the hopper for regulating the volume of materials discharged from said pan.

2. A feeder of the class described comprising a hopper open at its lower side, a discharge pan mounted for substantially rectilinear motion beneath said hopper, a housing secured to the lower side of said pan, a motor driven cam within said housing, a stationary bracket at the rear side of said hopper, a rod slidably mounted in said bracket and having its forward end projecting into said housing in secured relation therewith, a coil spring carried on said rod between said bracket and said housing, and a stop carried on said rod in rear of said bracket, said cam when in motion being adapted to impart reciprocating movement to said rod for the similar movement of said pan in a rearward direction against the tension of said spring, said spring acting to reverse the direction of motion of said rod and the pan between each working stroke of said cam.

3. The device as set forth in claim 2 and having the high and low points on the surface of the said cam arranged in stepped relation whereby the said coil spring will function to accelerate the forward motion of the said discharge pan.

4. The device as set forth in claim 2 and having the said stop adjustable to vary the working stroke of the said rod and pan and means for locking the stop in adjusted position.

5. A feeder of the class described comprising a frame, a hopper open at its lower side mounted within said frame, a discharge pan mounted for substantially rectilinear motion beneath said hopper, a housing secured to the lower side of said pan, a motor driven shaft mounted on said frame at one side of said hopper and having its free end projecting inwardly of an opening formed in the adjacent side of said housing, a cam mounted on the shaft end within said housing, a stationary bracket mounted on said frame at the rear of said hopper, a rod slidably mounted in said bracket and having its forward end projecting into said housing in secured relation therewith, a coil spring carried on said rod between said bracket and said housing, and a stop carried on said rod in rear of said bracket, said cam when in motion being adapted to impart reciprocating movement to said rod for the similar movement of said pan in a rearward direction against the tension of said spring, said spring acting to reverse the direction of motion of said rod and the pan between each working stroke of said cam, the said opening in said housing being of a size to give clearance to the motor shaft during the movements of said pan.

WILLIAM LE VERNE ZEIGLER.